US011891274B2

(12) United States Patent
Geisshüsler et al.

(10) Patent No.: US 11,891,274 B2
(45) Date of Patent: Feb. 6, 2024

(54) ELECTRONIC CATCHING DEVICE THAT CAN BE EASILY RESET

(71) Applicant: Inventio AG, Hergiswil (CH)

(72) Inventors: Michael Geisshüsler, Sursee (CH); Astrid Sonnenmoser, Hochdorf (CH); Faruk Osmanbasic, Sins (CH); Adrian Steiner, Inwil (CH); Christian Studer, Kriens (CH); Julian Stähli, Meggen (CH); Volker Zapf, Kriens-Obernau (CH); Urs Camenzind, Udlingenswil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/755,976

(22) PCT Filed: Nov. 20, 2020

(86) PCT No.: PCT/EP2020/082871
§ 371 (c)(1),
(2) Date: May 13, 2022

(87) PCT Pub. No.: WO2021/099562
PCT Pub. Date: May 27, 2021

(65) Prior Publication Data

US 2022/0402726 A1 Dec. 22, 2022

(30) Foreign Application Priority Data

Nov. 21, 2019 (EP) .................................... 19210774

(51) Int. Cl.
*B66B 5/22* (2006.01)

(52) U.S. Cl.
CPC ..................................... *B66B 5/22* (2013.01)

(58) Field of Classification Search
CPC ........................................................ B66B 5/22
See application file for complete search history.

(56) References Cited

U.S. PATENT DOCUMENTS

| | | | |
|---|---|---|---|
| 2,716,467 | A | 8/1955 | Callaway |
| 2018/0251339 | A1 | 9/2018 | Duvall |

(Continued)

FOREIGN PATENT DOCUMENTS

| | | | |
|---|---|---|---|
| CN | 204624883 | U | 9/2015 |
| CN | 105858398 | A | 8/2016 |

(Continued)

OTHER PUBLICATIONS

Machine translation of WO 2015/071188.*

*Primary Examiner* — Diem M Tran
(74) *Attorney, Agent, or Firm* — William J. Clemens; Shumaker, Loop & Kendrick, LLP

(57) ABSTRACT

A method and a catching device are used to catch a traveling body in an elevator system wherein traveling body is movable along a rail. The catching device includes a first braking element, a second braking element, a first guide element, a second guide element and an actuating element. The first braking element and the second braking element are brought into contact with the rail for braking. A first linear bearing is formed between the first braking element and the first guide element and a second linear bearing is formed between the second braking element and the second guide element. Both guide elements are moved between a rest position and a braking initial position, the actuating element moving the two guide elements from the rest position into the braking initial position.

17 Claims, 7 Drawing Sheets

(56) References Cited

U.S. PATENT DOCUMENTS

| | | | | |
|---|---|---|---|---|
| 2020/0207581 | A1* | 7/2020 | Sotoca | B66B 7/046 |
| 2022/0356044 | A1* | 11/2022 | Geisshüsler | B66B 5/22 |

FOREIGN PATENT DOCUMENTS

| | | | | | |
|---|---|---|---|---|---|
| DE | 2251659 | A1 | | 5/1973 | |
| DE | 3715098 | A1 | | 11/1987 | |
| EP | 1670710 | B1 | | 6/2006 | |
| EP | 1902993 | A1 | * | 3/2008 | B66B 11/006 |
| EP | 1902993 | A1 | | 3/2008 | |
| EP | 3789335 | A2 | * | 3/2021 | B66B 5/18 |
| WO | 2005044709 | A1 | | 5/2005 | |
| WO | WO-2007102211 | A1 | * | 9/2007 | B66B 5/20 |
| WO | 2015071188 | A1 | | 5/2015 | |
| WO | WO-2017125293 | A1 | * | 7/2017 | B66B 1/06 |
| WO | WO-2021122385 | A1 | * | 6/2021 | B66B 5/22 |

* cited by examiner

ELECTRONIC CATCHING DEVICE THAT CAN BE EASILY RESET

FIELD

The present invention relates to a catching device, to an elevator system and to a method for catching a traveling body of an elevator system.

BACKGROUND

In an elevator system, an elevator car is typically moved vertically along a travel path between different floors or levels within a structure. In this case, an elevator type is used in which the elevator car is held by cable-like or belt-like suspension elements and displaced within an elevator shaft by moving the suspension elements by means of a drive machine. In order to at least partially compensate for the load of the elevator car to be moved by the drive machine, a counterweight is attached to an opposing part of the suspension elements. An important aspect in elevator construction is safety. In particular, a fall of the elevator car or the counterweight, for example due to a suspension element tear, must be prevented. A failure of the drive brake can also lead to uncontrolled movement of the elevator car, which makes braking necessary. Catching devices can be triggered via an electrical signal. After the catching device has caught a traveling body, the catching device is usually lifted out of the catch by the main drive and thereby released. This typically requires very large forces.

WO2015071188 discloses a catching device for an elevator that can be triggered via an electrical signal. The catching device can be triggered electronically and the actuating device for actuating the safety brake is automatically reset. Releasing the safety brake requires a lot of force.

SUMMARY

An object of the invention is to improve the catching device so that it can be released more easily.

According to a first aspect of the invention, the object is achieved by a catching device for an elevator having a traveling body which is arranged so as to be movable along a rail. The catching device comprises a first braking element, a second braking element, a first guide element, a second guide element and an actuating element. The first braking element and the second braking element can be brought into contact with a rail for braking. A first linear bearing is formed between the first braking element and the first guide element, and a second linear bearing is formed between the second braking element and the second guide element. Both guide elements can be moved between a relevant rest position and a relevant braking initial position. The actuating element moves the two guide elements from the rest position into the braking initial position.

According to a second aspect of the invention, the object is achieved by an elevator system for the substantially vertical transport of passengers or goods. The elevator system comprises a car and a drive for moving the car. The elevator system comprises a catching device according to the first aspect of the invention.

According to a third aspect of the invention, the object is achieved by a method for catching a traveling body of an elevator system by means of a catching device. In the method, a first braking element is guided along a first guide element by a first linear bearing. A second braking element is guided along a second guide element by a second linear bearing. A single actuating element acts on the two guide elements and the two guide elements are thus pivoted from the rest position into the braking initial position.

Possible features and advantages of embodiments of the invention can be considered, inter alia and without limiting the invention, to be based upon the concepts and findings described below.

The braking elements of the catching device are typically designed to generate a frictional force on a rail if they are pressed against the rail. The frictional force is transferred to the traveling body and thereby causes braking, i.e. deceleration of the traveling body, in particular braking to a standstill, and if the traveling body is at a standstill, the traveling body is reliably held at a standstill. The braking element is mounted linearly along the guide element. This mounting is preferably in the form of a linear bearing. The linear bearing can be designed as a separate structural element between the braking element and the guide element, or the linear bearing can be designed by shaping the brake pad and the guide element so as to be adapted to one another. In both variants, the linear bearing can also comprise rolling elements. In particular, the linear bearing can comprise rolling elements in the form of cylindrical rollers or needle rollers, which are arranged in a flat cage, for example.

The rest position of the catching device corresponds to the normal operating state and allows the traveling body to be moved along the rail. The braking elements are spaced apart from the rail. The braking surfaces of the braking elements are preferably aligned parallel to the rail and thus also to one another. In the rest position, the braking elements are preferably furthest apart from one another in comparison to other operating states.

In order to initiate braking, the guide elements can be moved from the relevant rest position into the relevant braking initial position. In the braking initial position, one edge of the braking element is in contact with the rail. The braking element is displaced along the guide rail, i.e. in the linear bearing, as a result of the contact with the rail in combination with a contact pressure on the rail and a relative movement of the rail. Reaching the braking initial position of at least one of the two braking elements is a prerequisite for braking to take place. The movement from the rest position into the braking initial position can have a time delay between the first guide element and the second guide element.

The traveling bodies of the elevator system can typically be divided into a car and one or more counterweights. The cars, and often the counterweights as well, typically have two catching devices for braking on a rail. The rail is a brake rail and can also be a guide rail.

The catching device preferably has a single actuating element. The actuating element is suitable for generating a relative movement between two end regions of the actuating element. The actuating element can act linearly and build up a force between the two end regions to generate the movement. The force exerted by the actuating element, via the two end regions, on the body attached thereto is substantially aligned along a connecting line between the two end regions and acts in opposite directions on the two end regions. Alternatively, the actuating element can act rotationally and build up a moment between the two end regions to generate the movement. The moment exerted by the actuating element, via the two end regions, on the body attached thereto acts in opposite directions on the two end regions. The actuating element can be controlled via the trigger signal. A first of the two end regions of the actuating element is preferably connected to the first guide element and a second of the two end regions of the actuating element is connected to the second guide element. A first position of the actuating element holds the guide elements in the rest position, and a second position of the actuating element presses the braking elements onto the rail via the guide elements in the braking initial position.

The advantage of the catching device is that a method for triggering and resetting the catching device can be carried out. The catching device is in the rest position while the elevator system carries out journeys and loading and unloading on the floors in normal operation. By means of a monitoring unit, which can be part of the catching device, the catching device can receive the trigger signal which causes the actuating element to move the two guide elements from the rest position into the braking initial position. Advantageously, the actuating element not only moves the guide elements until they come into contact with the rail, but also exerts a force on the guide elements such that the braking elements are pressed against the rail at least to such an extent. The resulting frictional force is advantageously sufficient to move the braking elements along the linear bearing into a braking position. In the braking position, the braking elements clamp the rail with a normal force that is configured in such a way that the traveling body is brought to a safe standstill.

By moving the braking elements along the linear bearings into the braking position, the guide elements are advantageously moved back into the rest position. Advantageously, the normal force on the braking elements is much greater than the force with which the actuating element can deliver the braking elements to the rail via the guide elements. Therefore, moving the braking elements along the linear bearings into the braking position results in the actuating element being returned to its first position from its second position.

The first position of the actuating element is advantageously fixed by the actuating element before the catching device is released. The guide elements remain in the rest position when released. As a result, the catching device can be triggered again directly after releasing and without any further steps.

Advantageously, the release of the catching device causes only very small additional forces exceeding the weight of the traveling body when the traveling body is lifted out of the catch, although both braking elements cause high static friction forces on the rail. The reason for this is that the two braking elements are guided in linear bearings, which can be moved substantially without friction. Advantageously, the braking elements can remain adhered to the rail and the traveling body slips out of the catch by the braking elements sliding along the linear bearings from the braking position, via a position in which the braking elements lose contact with the rail, into the rest position. Since the linear bearings advantageously have very little friction, the drive substantially only has to lift the weight of the traveling body plus the very small frictional forces of the linear bearings when it is lifted out, i.e. when the traveling body is released.

According to a preferred embodiment, the catching device also comprises a housing. The first guide element is pivotably mounted on the housing of the catching device in a first bearing. In particular, the second guide element is pivotably mounted on the housing of the catching device in a second bearing.

According to a preferred embodiment, the first bearing and/or the second bearing is mounted so as to be pivotable about a relevant associated pivot axis, which is aligned parallel to the braking surfaces of the braking elements. In particular, the relevant associated pivot axis is also substantially perpendicular to the sliding direction of the associated first or second linear bearing. The permitted pivoting movement preferably comprises an angle of less than 10°.

According to a preferred embodiment, the first braking element is wedge-shaped. In particular, the first and second braking elements are wedge-shaped.

According to a preferred embodiment, the actuating element has an operating element and an energy store.

The energy store is able to store an amount of energy permanently and reliably so that the amount of energy is sufficient to move the guide elements from the rest position into the braking initial position with sufficient force and sufficiently quickly. The operating element is used to keep the energy store in the charged position and to ensure reliable triggering.

An alternative embodiment of the actuating element includes an electrical accumulator as an energy store and a drive that can be controlled by the trigger signal as an operating element.

According to a preferred embodiment, the operating element can keep the energy store in a charged state in which an amount of energy is stored. In response to a trigger signal, the operating element releases the energy store and the stored amount of energy moves at least one of the guide elements from the rest position into the braking initial position. According to a preferred embodiment, the energy store is designed as a spring element.

The term "charged" refers to the energy store having absorbed an amount of energy. Alternatively, the energy store can comprise a compressible amount of gas in a reservoir, a weight that can be lifted in the gravitational field, or a chargeable electrical accumulator.

The spring elements can be tension springs, compression springs or torsion springs. Metal springs such as leaf springs, spiral springs or disk springs are particularly advantageous. However, these springs can also be made of alternative materials, such as carbon fiber reinforced plastics material. Alternatively, air springs can also be used.

The energy store is preferably a mechanical energy store such as a spring or a weight. Energy can be stored by tensioning the spring or lifting the weight. The movement of the energy store associated with storing energy is preferably coupled directly to the two guide elements. In the rest position, the operating element prevents the spring from being able to relax or the weight from being lowered. In the rest position, the guide elements are advantageously held in the position corresponding to the rest position. The trigger signal preferably releases the energy store, and the movement of the energy store is transmitted to the guide elements.

In an alternative embodiment, the actuating device comprises a braking element which is controlled by the trigger signal. In the rest position, the braking element holds the energy store in a charged position counter to the force of the energy store via static friction forces.

According to a preferred embodiment, the operating element comprises a holding element and an electromagnet, which, in the current-carrying state, holds the holding element counter to the force of the energy store, and releases the energy store by a or the trigger signal, in particular by switching off the current flow.

The holding element is preferably made of ferromagnetic material. The holding element and the electromagnet are designed in such a way that the current-carrying electromagnet is able to hold the holding element and thus to hold the energy store in a charged position in the rest position counter to the force of the energy store. The force of the energy store is preferably reduced by means of a transmission, in particular a pawl, so that the electromagnet can be designed to be weaker.

According to a preferred embodiment, the first bearing is arranged on the first guide element between a first region of the first guide element, on which the first braking element is guided, and a second region of the first guide element, with which the actuating element engages, and/or the second bearing is arranged on the second guide element between a first region of the second guide element, on which the second braking element is guided, and a second region of the second guide element, with which the actuating element engages.

The advantage of this arrangement of the bearing is that the bearing force on the first guide element, or the second guide element, is always directed toward the housing. In particular when the guide elements are moved from the rest position into the braking initial position and also in the braking position, the bearing force is directed toward the housing. As a result, the bearing can be designed as a half bearing, which allows simple and quick assembly. Alternatively, of course, the bearing can also be attached to one of the two ends of the guide elements.

According to a preferred embodiment, the actuating element substantially generates a force between the second region of the first guide element and the second region of the second guide element. This has the advantage that both guide elements can be moved into the braking initial position by one actuating element.

According to a preferred embodiment, the first region of the first guide element is positioned against a first stop of the housing in the rest position, in particular the first region of the second guide element is positioned against a second stop of the housing in the rest position.

The stop transfers the normal forces of the braking elements that occur during braking from the guide elements to the housing. The advantage is that the guide elements lie flat on the stop and the force acting on the guide elements is transmitted to the stop. As a result, the guide element is not subject to bending, and the guide elements can be manufactured much more cheaply.

According to a preferred embodiment, the actuating element is under tensile forces in the rest position, and as a result the two guide elements are pressed against the respective stops in the rest position.

According to a further embodiment, the two guide elements are held on the respective stops by fixing elements, in particular permanent magnets or mechanical snappers.

There may be backlash between the two stops and the associated guide elements. Vibrations that occur while driving could cause the guide elements and the stop to collide and generate noise. The guide elements are advantageously held in place by the fixing elements.

The two guide elements can also be moved asymmetrically during the movement from the rest position into the braking initial position. In particular when using a fixing element, initially only one guide element is supplied, and only when this first guide element presses against the rail is the second guide element released from its fixing element.

According to a preferred embodiment, the catching device has a substantially cuboid intermediate region between the first braking element in the rest position and the second braking element in the rest position, and the actuating element is positioned on the catching device in such a way that the actuating element is always located outside the intermediate region extended to infinity along the longest main axis of the actuating element.

According to a further embodiment, the catching device has an additional reset system.

If the catching device is triggered while the traveling body is not moving, the braking elements remain in the braking initial position. In order to reset the catching device, the traveling body could be moved in such a way that the braking elements are moved from the braking initial position into the braking position. The additional reset system simplifies resetting the catching device by resetting the actuating element directly, i.e. without moving the traveling body.

The additional resetting element has the effect that the catching device is transferred to the rest position. In this case, the energy store is in particular also recharged. Such a resetting element can be formed by a suitable drive, for example an electric motor, which is able to tension the energy store again, for example in the form of a spring. However, resetting could also be carried out by manpower, by the manpower being transferred to the energy store via a mechanism, for example a Bowden cable or a lever system. Manpower can be provided, for example, by inserting a screwdriver into an opening inside the car. A preferably hidden pusher or lever could also be actuated in the car, so that the manpower can be transferred to the energy store. The movement of pushing, pulling or operating is transferred to the energy store, which is charged as a result.

In this application, the braking elements, the guide elements, the linear bearings and the stops are present in a first and in a second instance. If these terms are used without the indexing terms “first” or “second,” the statement of the sentence applies to both terms.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
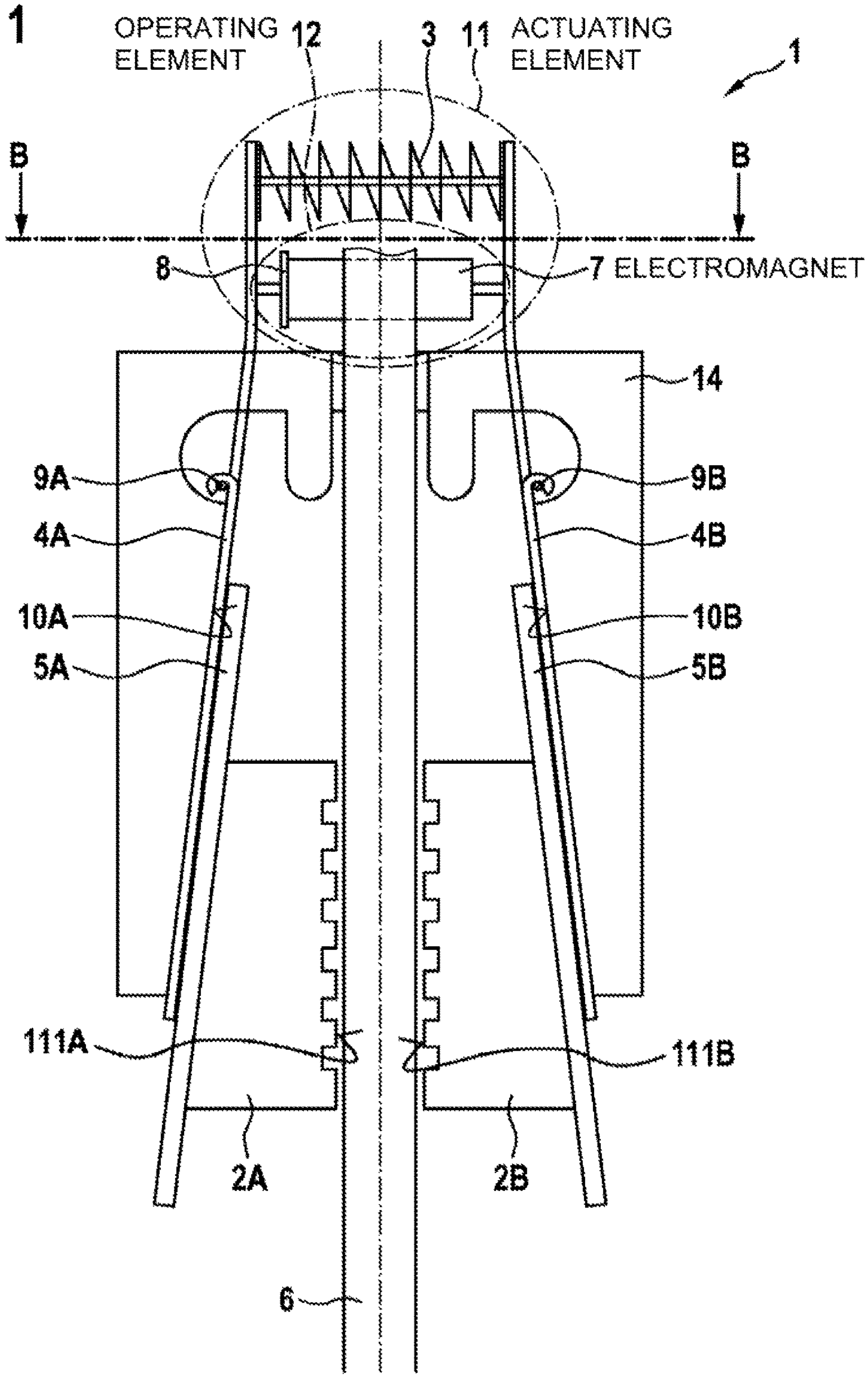
FIG. 1 is a side view of the catching device in the rest position.

FIG. 1 is a side view of catching device 1 in the rest position. The first guide element 4A rests against the stop 10A and the second guide element 4B rests against the second stop 10B. The two guide elements 10A, 10B each guide a braking element 2A, 2B. A linear bearing 5A, 5B, which is designed as an independent structural element, assumes the guiding function. The guide element 4A, 4B extends from the region of the brake pad 2A, 2B via the two bearings 9A, 9B to the actuating element 11. The actuating element 11 comprises a spring, which acts as an energy store 3, and an operating element 12. Both the operating element 12 and the energy store 3 are independently connected to the first two regions of the guide elements 4A, 4B. The operating element 12, which comprises the electromagnet 7 and the holding plate 8, is able to hold the energy store 3 in a charged position. The catching device 1 is attached to a traveling body in such a way that the rail 6 extends through between the two braking elements 2A, 2B. The bearings 9A, 9B pass the bearing forces of the guide element 4A, 4B into the housing 14. The housing 14 also comprises the stop 10A, 10B. The first braking surface 111A and the second braking surface 111B are used for braking on the rail 6.

Figure 2:
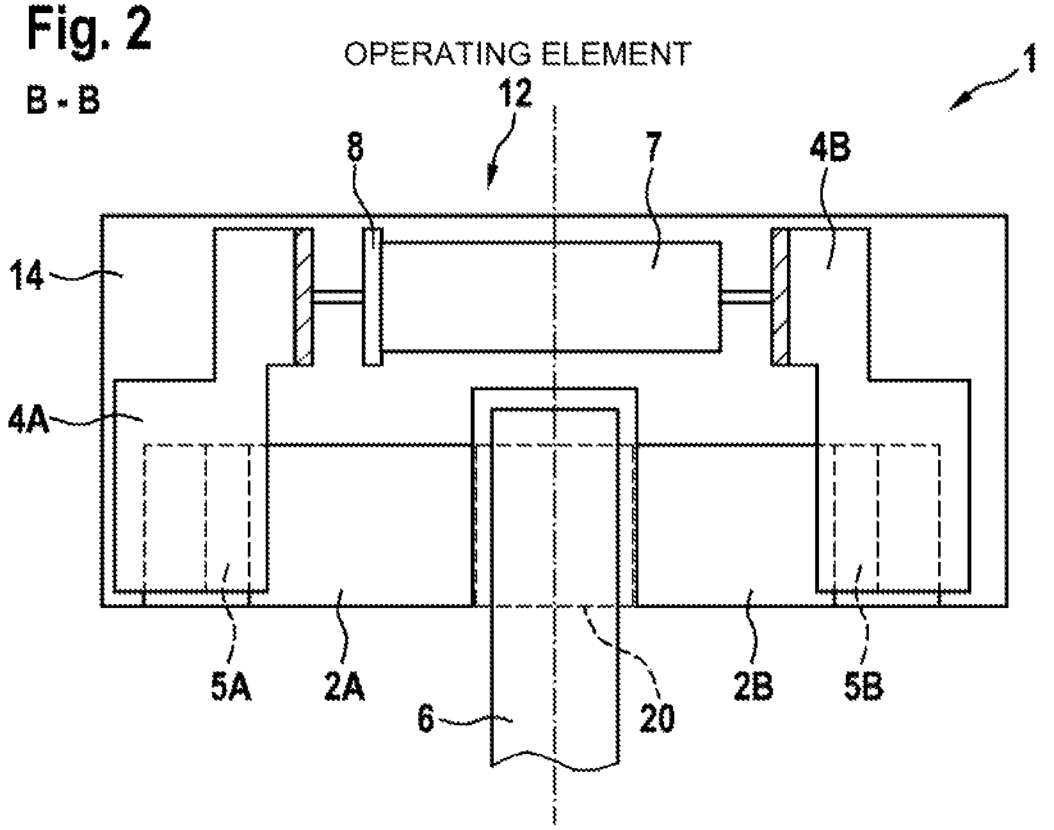
FIG. 2 is a section of the catching device of FIG. 1.

FIG. 2 is a section B-B of the catching device 1 from FIG. 1. Between the two braking elements 2A, 2B there is a substantially cuboid intermediate region 20. This cuboid intermediate region 20 is used to define the space in which the rail 6 is accommodated. For this purpose, the intermediate region 20 can be theoretically extended to infinity along its longest main axis. The actuating element 11, of which only the operating element 12 is shown, is located outside of this infinitely extended intermediate region 20.

Figure 3:
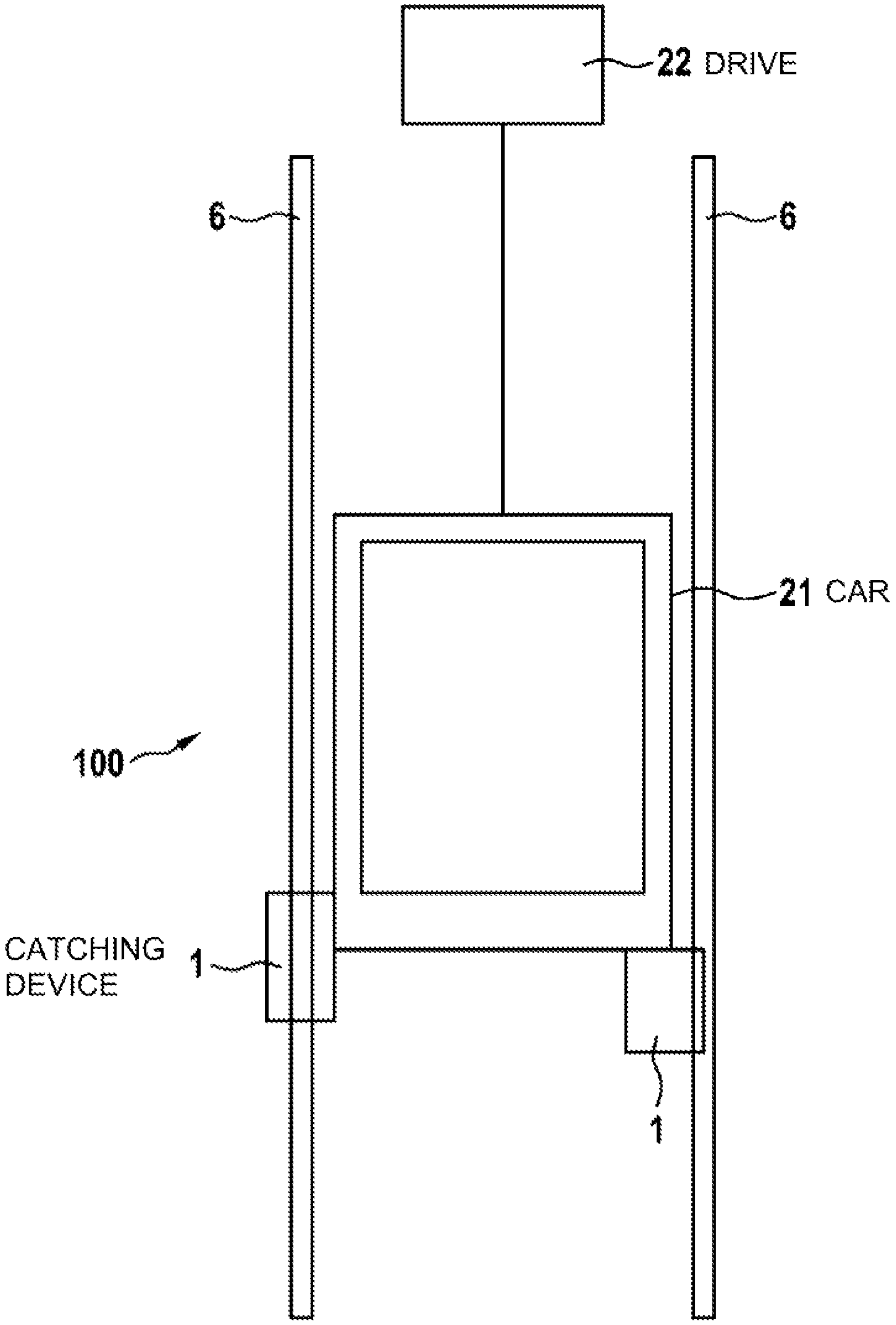
FIG. 3 shows an elevator system with a catching device.

FIG. 3 shows an elevator system 100. Such an elevator system 100 comprises at least a drive 22, a rail 6 and a car 21. In addition, such an elevator system 100 comprises at least one catching device 1, as known from FIG. 1. The catching device 1 can, as shown by way of example on the left in FIG. 3, be located substantially at the side of the car 21. There is substantially no overlapping region between the car 21 and the catching device 1 in a vertical projection of the elevator. Alternatively, the catching device 1 can, as shown by way of example on the right in FIG. 3, be located substantially underneath the car 21. There is substantially no overlapping region between the car 21 and the catching device 1 in any possible horizontal projection of the elevator.

Figure 4:
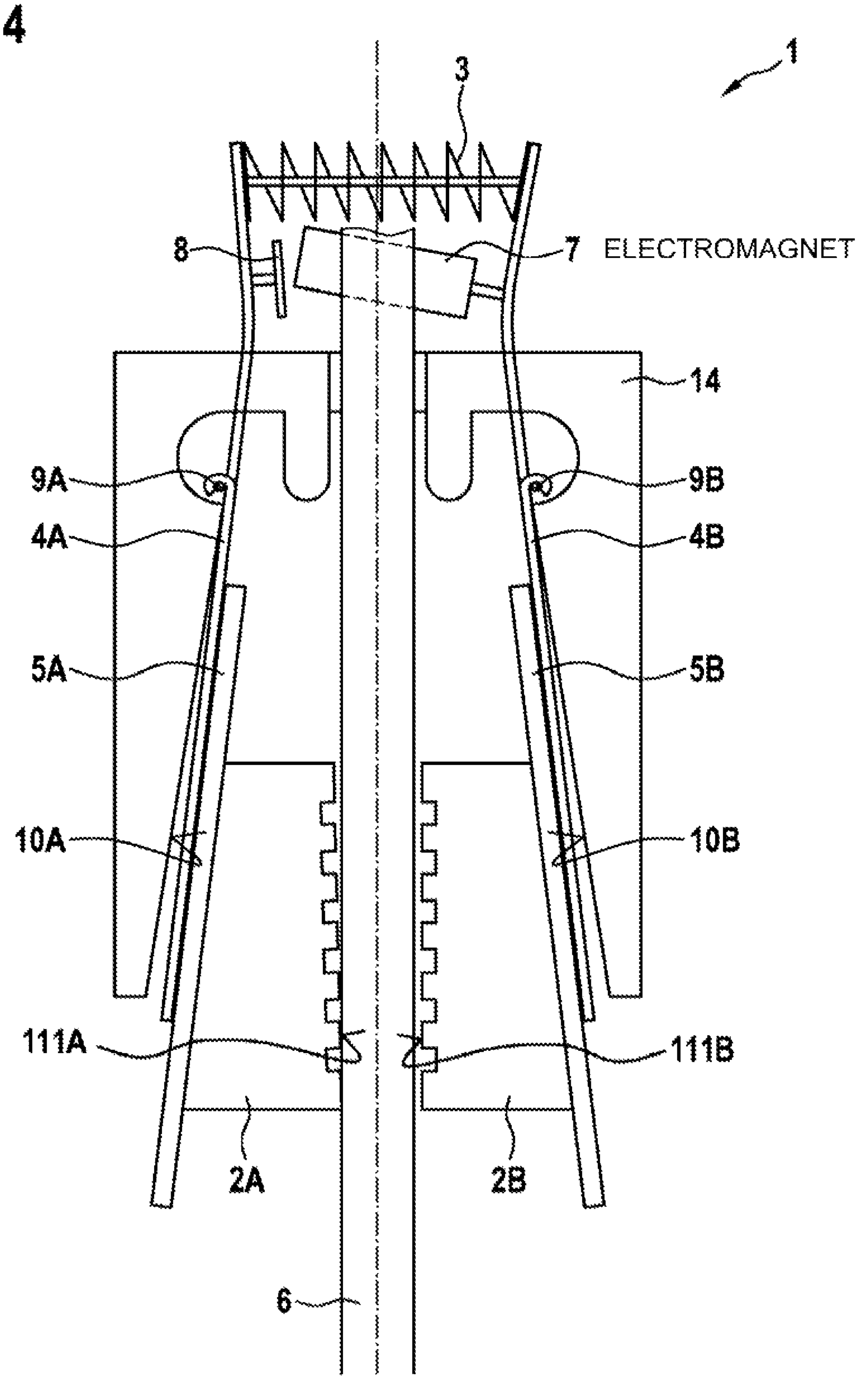
FIG. 4 is a side view of the catching device in the braking initial position.

FIG. 4 is a side view of the catching device 1 from FIG. 1 in the braking initial position. The braking initial position is reached by interrupting the current flow through the electromagnet 7. As a result, the holding force between the electromagnet 7 and the holding plate 8 drops, and the energy store 3 is designed, i.e. in particular able to apply sufficient force, to press the two guide elements 4A, 4B against one another at the energy store 3, i.e. between the second region of the first guide element 4A and the second region of the second guide element 4B. The energy store 3 is designed as a compression spring. As a result, the braking elements 2A, 2B guided on the guide elements 4A, 4B are displaced relative to one another and in the direction of the rail. This can also take place asymmetrically. The first brake pad 2A is already in contact with the rail 6 and has therefore already fully reached the braking initial position. The second brake pad 2B is still at a small distance from the rail 6 and has therefore not yet fully reached the braking initial position. As soon as the second brake pad 2B also touches the rail, the residual tension remaining in the partially relaxed energy store 3 will act on the contact points of the brake pads 2A, 2B with the rail 6 via the guide elements 4A, 4B, which act as levers. When both brake pads 2A, 2B touch the rail, the remaining force of the energy store 3 is transmitted from the two guide elements 4A, 4B to the brake pads 2A, 2B and the rail 6. The normal force generated between the rail 6 and each of the two brake pads 2A or 2B then leads to the braking elements 2A, 2B being displaced into the braking position if the rail 6 is displaced relative to the catching device 1 in the direction to be braked. The first braking surface 111A and the second braking surface 111B are used to apply the normal force to the rail 6.

Figure 5:
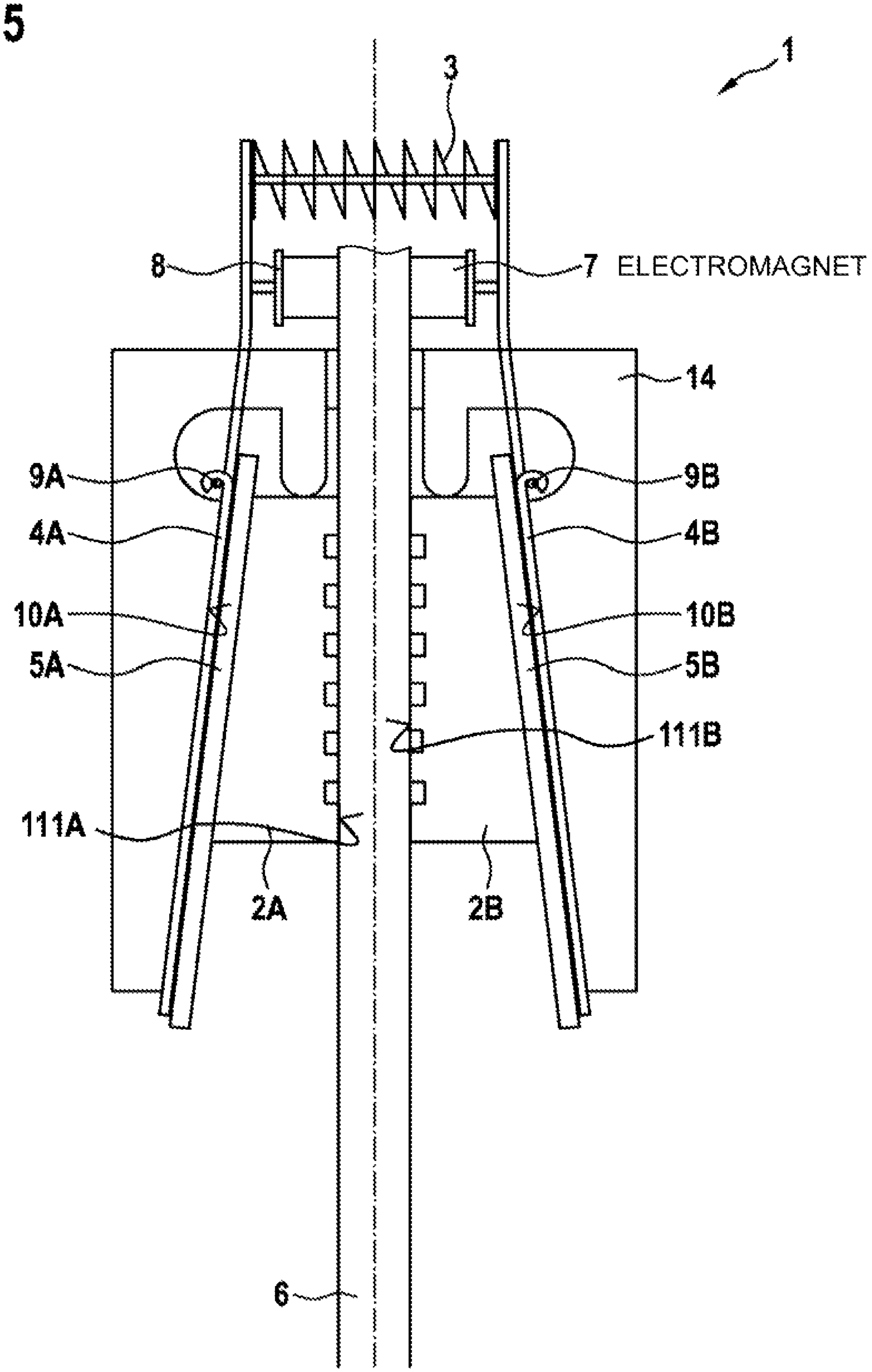
FIG. 5 is a side view of the catching device in the braking position.

FIG. 5 is a side view of the catching device 1 in the braking position, in which the braking elements 2A, 2B are moved up to the braking position. In the braking position, the braking elements 2A, 2B cause a very large normal force on the rail 6. This normal force is limited by the fact that the housing 14 can expand resiliently, and the braking elements 2A, 2B in the braking position can thus produce a sufficient normal force, even with the already worn braking elements 2A, 2B. A sufficient normal force generates sufficient frictional forces to ensure a secure catch. The normal force that the braking elements 2A, 2B apply to the brake rail 6 is much greater than the contact force that the energy store 3 causes via the guide elements 4A, 4B on the braking elements 2A, 2B in the braking initial position. Therefore, during the movement into the braking position, the two moving braking elements 2A, 2B move the guide elements 4A, 4B back to the corresponding stops 10A, 10B. As a result, the energy store 3 is recharged. The holding plate 8 and the electromagnet 7 are brought into contact with one another again by this movement or at least come so close that switching on the electromagnet 7 causes the two to adhere to one another. In the braking position, the catching device 1 can hold the traveling body for any length of time. The first braking surface 111A and the second braking surface 111B are used for braking on the rail 6 and are pressed flat against the rail 6 for this purpose. The braking surfaces have a braking profile.

In order to release the elevator system, the electromagnet 7 is first switched on again. A current flow through the electromagnet 7 is thus activated. In particular, any gap between the holding plate 8 and the electromagnet 7 is so small that the switching on of the electromagnet 7 is able to attract the holding plate 8. The catching device 1 is thus ready for use again and can be triggered at any time. Releasing is carried out by lifting out the traveling body. The braking elements 2A, 2B remain stationary due to the static friction between the rail 6 and the braking elements 2A, 2B, while the traveling body is lifted out upwards. The braking elements 2A, 2B slide along the linear bearings 5A, 5B into the rest position. As a result, there are almost no additional frictional forces and releasing can be carried out using the normal drive motor.

Figure 6:
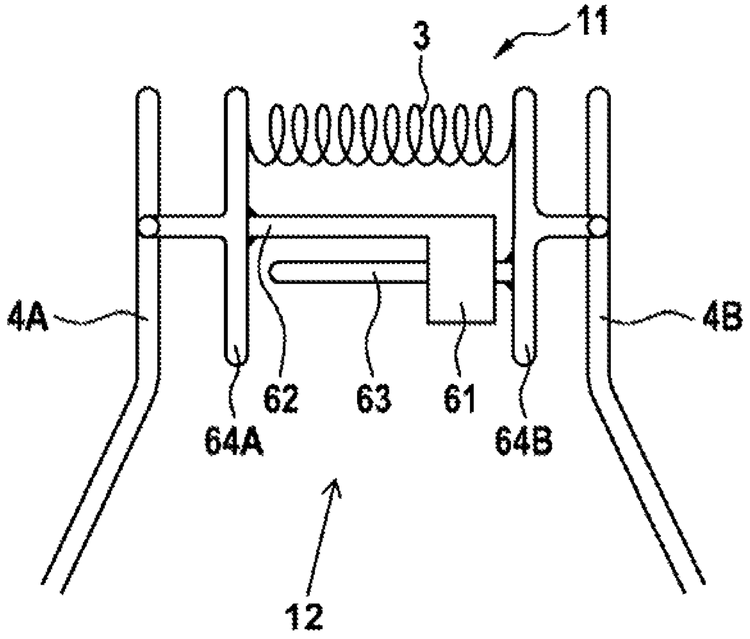
FIG. 6 is a detailed view of the actuating element.

FIG. 6 is a detailed view of the actuating element 11 with an alternative operating element 12. A clamping element 61 can either clamp a rod 63 and thus hold the energy store 3 in a tensioned position, or release the rod 63 and thus cause the catching device to be triggered. This embodiment has caps 64A and 64B which allow the operating element 12 and the energy store 3 to rotate relative to the guide elements 4A, 4B. The rod 63 is rigidly connected to the cap 64B. The clamping support 62 is firmly connected to the cap 64A. In a further alternative embodiment, the actuating element can comprise a drive which is controlled by the trigger signal.

Figure 7:
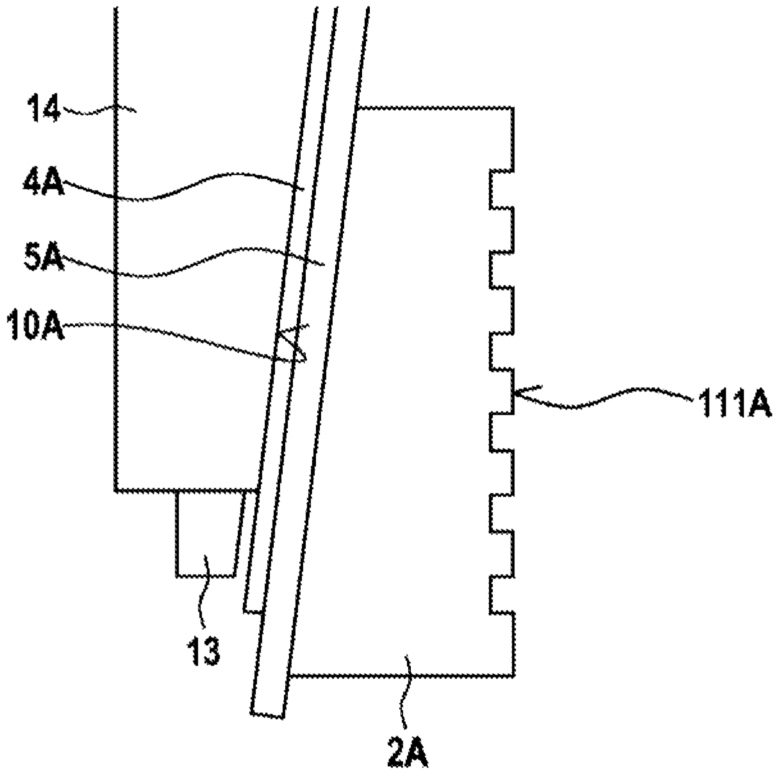
FIG. 7 is a detailed view in the region of the braking element.

FIG. 7 is a detailed view in the region of the braking element 2A. In addition to the elements known from FIG. 1, a fixing element 13 is also attached here. Preferably, this fixing element 13 is attached to the housing and acts as an extension of the stop 10A. The object is to eliminate any backlash between the stop 10A and the guide element 4A, or at least to fix the backlash in such a way that the guide elements remain at least safely spaced apart from the rail 6. In addition, rattling is effectively prevented. The first braking surface 111A is used to apply the normal force to the rail.

Figure 8:
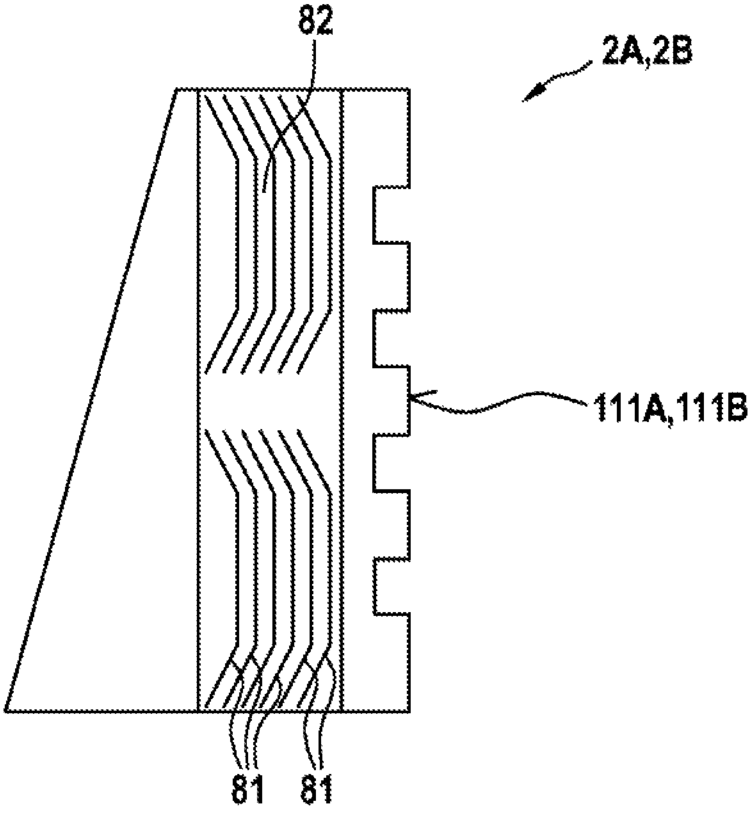
FIG. 8 shows another embodiment of the braking element.

FIG. 8 shows a further embodiment of the braking element, which allows the housing to be designed to be rigid. Instead of the housing having to be resilient in order to prevent excessive normal forces from occurring in the braking position, the braking element 2A, 2B can be designed in such a way that a spring assembly 82 in the braking element limits the normal force. In particular, the spring assembly 82 can be made up of disk springs 81. In this case, only the first braking element 2A, only the second braking element 2B, or both braking elements can have a spring assembly. The first braking surface 111A and the second braking surface 111B are used to apply the normal force to the rail.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A catching device for an elevator system, the elevator system having a traveling body that is movable along a rail, the catching device comprising:
- a first braking element;
- a second braking element;
- a first guide element;
- a second guide element;
- an actuating element;
- wherein the first braking element and the second braking element are movable into contact with the rail for braking the traveling body;
- a first linear bearing being formed between the first braking element and the first guide element;
- a second linear bearing being formed between the second braking element and the second guide element;
- wherein the first and second guide elements are movable between a rest position and a braking initial position;
- wherein the actuating element when activated moves the first and second guide elements from the rest position into the braking initial position;
- a housing with the first guide element pivotably mounted on the housing in a first bearing; and
- wherein the first bearing is pivotable about an associated pivot axis, the pivot axis being aligned parallel to braking surfaces of the first and second braking elements and the pivot axis being substantially perpendicular to a sliding direction of the first linear bearing.

2. The catching device according to claim 1 wherein the actuating element asymmetrically moves the first and second guide elements from the rest position into the braking initial position.

3. The catching device according to claim 1 wherein the second guide element is pivotably mounted on the housing in a second bearing.

4. The catching device according to claim 3 wherein the second bearing is pivotable about an associated pivot axis that is aligned parallel to the braking surfaces of the first and second braking elements and the associated pivot axis is substantially perpendicular to the sliding direction of the second linear bearing.

5. The catching device according to claim 1 wherein at least one of the first braking element and the second braking elements is wedge-shaped.

6. The catching device according to claim 1 wherein the actuating element includes an operating element and an energy store.

7. The catching device according to claim 6 wherein the operating element keeps the energy store in a charged state in which an amount of energy is stored, and wherein the operating element releases the energy store in response to a trigger signal such that the stored amount of energy moves at least one of the first and second guide elements from the rest position into the braking initial position.

8. The catching device according to claim 7 wherein the operating element includes a holding element and an electromagnet, the electromagnet, in a current-carrying state, holds the holding element counter to a force generated by the energy store, and the operating element releases the energy store in response to the trigger signal by switching off current flow through the electromagnet.

9. The catching device according to claim 1 wherein the first bearing is arranged on the first guide element between a first region of the first guide element, on which first region the first braking element is guided, and a second region of the first guide element with which the actuating element engages, and/or wherein the second guide element is pivotably mounted on the housing in a second bearing arranged on the second guide element between a first region of the second guide element, on which first region the second braking element is guided, and a second region of the second guide element with which the actuating element engages.

10. The catching device according to claim 9 wherein the first region of the first guide element is positioned against a first stop of the housing in the rest position, and/or the first region of the second guide element is positioned against a second stop of the housing in the rest position.

11. The catching device according to claim 10 wherein the actuating element is under tensile forces in the rest position pressing the first and second guide elements against the first and second stops respectively in the rest position.

12. The catching device according to claim 10 wherein the first and second guide elements are held on the first and second stops respectively by fixing elements.

13. The catching device according to claim 12 wherein the first and second stops are permanent magnets or mechanical snappers.

14. The catching device according to claim 9 wherein the actuating element generates a force between the second region of the first guide element and the second region of the second guide element.

15. An elevator system for the vertical transport of passengers or goods, the elevator system comprising:
- a car;
- a drive for moving the car; and
- the catching device according to claim 1 wherein the car is the traveling body and the catching device is located on the car.

16. A method for catching a traveling body of an elevator system using the catching device according to claim 1, the method comprising the steps of:
- guiding the first braking element along the first guide element by the first linear bearing;
- guiding the second braking element along the second guide element by the second linear bearing; and
- operating the actuating element to act on the first and second guide elements and pivot the first and second guide elements from the rest position into the braking initial position of the catching device.

17. A catching device for an elevator system, the elevator system having a car that is movable along a rail, the catching device comprising:
- a first braking element;
- a second braking element;

a first guide element;

a second guide element;

an actuating element;

wherein the first braking element and the second braking element are movable into contact with the rail for braking the car;

a first linear bearing being formed between the first braking element and the first guide element;

a second linear bearing being formed between the second braking element and the second guide element;

wherein the first and second guide elements are movable between a rest position and a braking initial position;

wherein the actuating element when activated moves the first and second guide elements from the rest position into the braking initial position;

a housing with the first guide element pivotably mounted on the housing in a first bearing;

wherein the first bearing is pivotable about an associated pivot axis, the pivot axis being aligned parallel to braking surfaces of the first and second braking elements and the pivot axis being substantially perpendicular to a sliding direction of the first linear bearing; and wherein the first bearing is arranged on the first guide element between a first region of the first guide element, on which first region the first braking element is guided, and a second region of the first guide element with which the actuating element engages, and/or wherein the second guide element is pivotably mounted on the housing in a second bearing arranged on the second guide element between a first region of the second guide element, on which first region the second braking element is guided, and a second region of the second guide element with which the actuating element engages.

* * * * *